May 10, 1966      M. D. TUPPER      3,250,932
DYNAMOELECTRIC MACHINE BEARING SUPPORT AND
LUBRICATION ARRANGEMENT
Filed Jan. 2, 1964
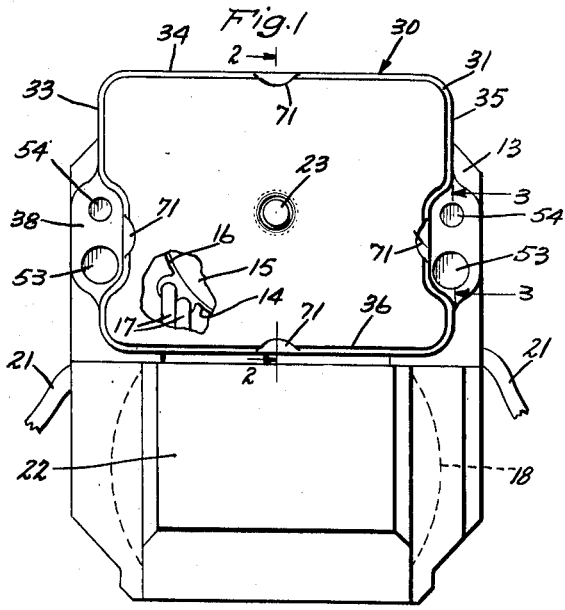
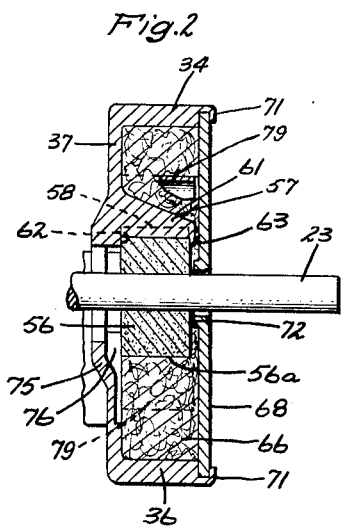
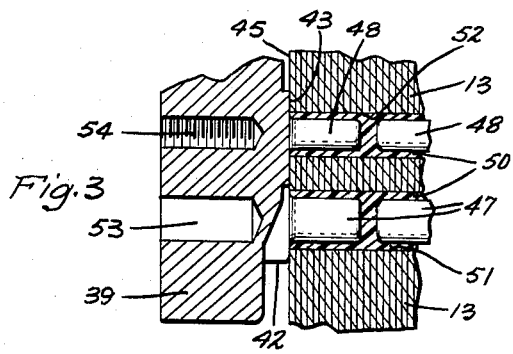
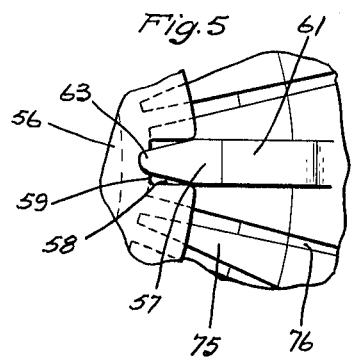
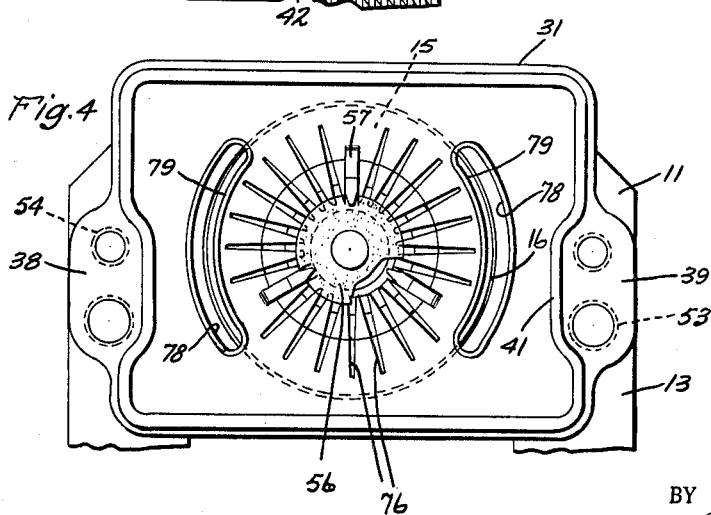
INVENTOR.
Myron D. Tupper,
BY John M. Stoudt
Attorney.

United States Patent Office 3,250,932
Patented May 10, 1966

3,250,932
DYNAMOELECTRIC MACHINE BEARING SUPPORT AND LUBRICATION ARRANGEMENT
Myron D. Tupper, Fort Wayne, Ind., assignor to General Electric Company, a corporation of New York
Filed Jan. 2, 1964, Ser. No. 335,237
7 Claims. (Cl. 310—90)

This invention relates generally to dynamoelectric machines and more particularly to an improved end frame and lubrication arrangement for use in small electric motors employing sleeve bearings which support a rotor shaft.

In the construction of small electric motors of the type illustrated and disclosed in my Patent 3,024,377 granted March 6, 1962 and assigned to the same assignee as the present invention, there are practical problems in furnishing a low cost, yet satisfactory, bearing support and lubrication arrangement for the sleeve type bearings which rotatably journal the rotor shaft. For instance, these motors are employed today in many domestic refrigerators to drive air circulating fans. They are generally mounted in relatively inaccessible locations in the equipment where it is impractical if not impossible to re-supply lubricant reservoirs normally incorporated in the motors which feed lubricant to the bearing journals. In addition, in some cases the space available for these motors is a limiting factor on the overall dimensions and size of the motor, restricting the total amount of lubricant which may be stored in the motor. Moreover, these motors usually use relatively inexpensive and inherently weak sintered sleeve type bearings which, if improperly aligned with one another and with the shaft causing intereference with the freedom of shaft rotation, wear excessively and fail or crack prematurely. All of these problems add to the expense and difficulties in the manufacture of a satisfactory, yet compact motor.

Accordingly, it is a general object of the present invention to provide a dynamoelectric machine with an improved bearing support and lubrication arrangement and it is a more specific object to provide an improved yet low cost small electric motor overcoming the problems and difficulties mentioned above.

It is a further object of the present invention to provide a small electric motor with an improved bearing support and lubrication system which permits proper alignment of the bearings and shaft during lubrication of the motor.

In carrying out the objects in one form I provide a small electric motor having a rotor mounted on a shaft for rotation relative to a stator with an improved shaft supporting and lubricating arrangement. An enlarged casing is secured to the stator adjacent at least one side face of the stator and has a bottom wall, transverse to the motor axis, extending radially outward beyond the air gap defined between the rotor and stator. This wall includes a number of axial posts projecting generally away from the stator which are received in axial grooves formed in the outer periphery of a sleeve bearing to support the bearing. The walls of enlarged casing remote from the stator, along with a cover, form a lubricant reservoir cavity which surrounds the outer periphery of the bearing, except in the region of engagement between the bearing and axial posts. The cavity in turn has suitable lubricant retaining means for storing lubricant and for feeding lubricant to the bearing and its bore as dictated by the lubricant requirements of the journalled shaft. At the inboard end of the bearing the transverse wall of the casing is formed with a frusto-conical flanged section surrounding the bearing and includes on the surface disposed towards the cavity a number of radially projecting grooves sufficiently small in size to act as capillaries. The grooves recapture excess lubricant slung outwardly at the inboard end of the bearing and return it by capillary action to the reservoir for reuse.

Within the cavity, arranged outwardly of the axial posts, are a pair of diametrically opposed hollow flanges projecting axially away from the casing wall having the posts. The hollow spaces within the flanges provide unobstructed arcuate openings entirely through the casing wall next to the stator in alignment with the air gap. The hollow flanged construction performs several functions. It permits access to the air gap for removing shims therefrom if such are used in the assembly of the stator and rotor to obtain proper alignment of the motor components. In addition, it serves as a breather vent to maintain the reservoir at the same pressure as that of the environment externally of the casing to produce an even flow of lubricant from the reservoir to the bearing over an extended period of time. And finally, the hollow flanged construction acts as a capillary barrier to prevent escape of lubricant through the unobstructed openings.

The subject matter which I regard as my invention is is particularly pointed out and distinctly claimed in the concluding portion of this specification. My invention, itself, however, both as to its organization and method of of operation, together with further objects and advantages thereof may best be understood by reference to the following description taken in connection with the accompanying drawing.

In the drawing:

FIG. 1 is an end elevational view, partly broken away, of a small shaded pole type electric motor incorporating the present invention in one form;

FIG. 2 is a view taken along line 2—2 in FIG. 1;

FIG. 3 is a fragmentary view taken along line 3—3 in FIG. 1 to show the manner in which the bearing support and lubricant reservoir housing of this embodiment is mounted on the illustrated motor;

FIG. 4 is an end view of the housing shown in FIG. 1 with the outer cover and lubricant absorbent material of the reservoir removed to show details of the lubrication system; and FIG. 5 is an enlarged fragmentary view of a part of the bearing supporting arrangement seen in FIG. 4.

Referring now to the figures of the drawing in more detail, the preferred embodiment of my invention is illustrated as being incorporated in a small shaded pole induction electric motor 10 having a stator 11 of the kind disclosed in my previously mentioned patent. Briefly described the stator is formed with a laminated core of magnetic material in which a main yoke section 13 provides a rotor receiving bore by a pair of oppositely disposed pole faces. One of these pole faces is partially seen in FIG. 1 and is indicated at 14.

A rotor 15, standard squirrel cage induction type arranged in the bore to define an air gap 16 with the stator, is activated during operation by means of magnetic flux passing between the pole faces in the well understood way. Suitable shading coils are included at the trailing ends of the pole faces to provide starting torque and to aid in producing running torque. For instance, the shading coils for pole face 14 may comprise copper rings, indicated by numeral 17, and it will be appreciated that similar coils may be located diametrically opposite on the other pole face in a similar fashion.

The magnetic flux for exciting rotor 15 is furnished by an electrical winding (not shown) which is suitably carried on a core section 18 bridging depending legs 19 of the stator core. This construction serves to complete the flux path between the pole faces and core section 18. The winding is encapsulated in an imperforate covering 20 of thermo-responsive material, such as epoxy resin, and may be excited by insulated conductor leads 21 which project through the covering.

In order to support the rotor for relative rotation with respect to the stator, the rotor is suitably secured to an output shaft 23, in turn, journalled at opposite sides of the rotor by a pair of identical end frame housings or assemblies, generally denoted by numeral 30, which serve as both the supporting and lubricating means for the shaft. For simplicity of illustration and brevity of description, only one of these end frame assemblies has been shown in detail. As illustrated in the drawing, the assembly has a large casing 31, preferably cast or molded into a generally rectangular configuration, forming a lubricant cavity defined by the inner surfaces of four integral and axially extending walls 33–36 inclusive and of a generally radial bottom wall 37, which extends across and beyond air gap 16.

As best seen in FIGS. 1 and 3, casing 31 is securely mounted to the stator by a pair of embossments 38 and 39 extending radially outward from depressions 41 in walls 33 and 35 respectively. Each embossment terminates in a boss 42 having a flat surface 43 arranged to abut firmly against the side face 45 of stator yoke section 13. This construction spaces certain regions of wall 37 axially away from stator section 13 for reasons to be explained hereinafter. Two axial, cylindrical, protuberances 47 and 48 project into accommodating passageways 51 and 52 of core section 13, in spaced relation to the walls of the passageway. Hardened adhesive thermo-responsive material, such as thermosetting epoxy resin 50, fills the remainder of the passageways, surrounding the protuberances to retain them firmly in the passageways. These same passageways may also serve to mount the protuberances of the other end frame of the motor. With the passageways located near the outer edges of the yoke section 13, away from the legs of the yoke, they will not appreciably interfere with or adversely affect the magnetic circuit through the yoke section. Suitably threaded holes 53 and 54 may be provided directly over protuberances 47 and 48 respectively for receiving mounting bolts (not shown) to attach the motor onto the desired supporting structure. This allows the use of an unusually deep hole in the casing without weakening it.

Referring now to FIGS. 3, 4, and 5, a sleeve bearing 56 of the permeable, sintered, type is supported centrally within the casing cavity for journalling one end of rotor shaft 23. A secure and rigid mount is provided by casing 31 in the form of three angularly and equally spaced apart support arms or posts 57 which have one end integrally joined to the surface of wall 37, remote from the stator, and extend away from the stator within the cavity of the casing. Each arm, relatively narrow in angular width, is accommodated in longitudinal grooves 58 extending axially across the outer periphery of the bearing at angular locations approximating those of the arms. Preferably, each arm is tapered at its radially inner edge, as indicated at 59 in FIG. 5, to facilitate installation and proper seating of the bearing. This interlocking construction holds the bearing against torsional or angular movement relative to casing 31. For augmenting the strength of the arms and for taking up as little space in the cavity as is practical under the circumstances, I prefer to incline the outer edge 61 radially outward from a minimum dimension at the free end to a maximum adjacent wall 37. The total axial length of the arms should be somewhat less than the axial depth of the cavity wall 37. In order to prevent axial movement of the bearing, arms 56 are each formed with a shoulder 62 in the vicinity of wall 37 for engagement with the inboard end of the bearing and may be swedged over or staked at the free end, as shown at 63, after the bearing has been slid into position in abutting relation with the shoulder.

Turning now to a further aspect of casing 31, it will be seen from FIGS. 2 and 4 that its cavity forms an enlarged lubricant reservoir which completely surrounds the outer longitudinal periphery 56a of bearing 56, except in the narrow regions where the arms 57 support the bearing. Although any suitable means may be utilized to store or retain the lubricant, I show lubricant absorbent felt material 66 in the form of a single-piece pad impregnated with lubricant or oil for this purpose which fills the cavity and is in contact with bearing surface 56a. Lubricant is thus fed from material 66 through the area of contact with bearing surface 56a into the body of bearing 56 and thence radially through it to the journal for lubricating the shaft. It will be understood that this seepage occurs at a very slow rate, for example, at a rate in the neighborhood of one tenth of a cubic centimeter per thousand hours of operation. To protect the reservoir and to prevent the evaporation of lubricant a plate 68 formed of sheet material is mounted to the rim of walls 33–36 inclusive for enclosing the cavity outwardly from the outboard end of the bearing. This may be readily accomplished by forming a continuous recess 69 in the rim and staking a small portion of the wall over the outer edge of the plate, which is accommodated by wall recess 69 as shown by numeral 71 in FIGS. 1 and 2. An inwardly projecting flange 72 encircles a hole in the plate through which the shaft projects and furnishes a seal with the periphery of the shaft.

At the inboard end of the bearing, casing wall 37 includes a frusto-conically shaped section 75 having a plurality of radial capillary grooves 76 which preferably extend upwardly along the surface of wall 37 within the lubricant cavity to a point beyond the integral connection of arms 57 with the wall. These grooves collect excess lubricant, which may accumulate at the inboard end of the bearing and be thrown outwardly by centrifugal action, and return it by capillary action to the absorbent material 66 for reuse. I have found in actual practice that in order to perform this capillary return function, the grooves should be less than 0.06 inch in width and should taper from a maximum dimension near the shaft to a minimum width at their upper ends to insure a positive flow of the collected lubricant upwardly to the reservoir. If desired, a small washer (not shown), attached to rotate with the shaft, may be used within the confines of section 75 to assist in slinging the excess oil toward grooves 76. Also, the inner wall of plate 68, especially if made by a casting, molding, or sintering procedure, may incorporate the same type of capillary return grooves for transferring lubricant from the outboard end of the bearing to reservoir material 66.

Intermediate the ends of capillary grooves 76 and each of the opposed walls 33, 35 at the longitudinal ends of the cavity, the side surface of bottom wall 37 remote from the stator is constructed with a pair of integral, hollowed flanges or barriers 79. These barriers, shown in FIGS. 2 and 4, are contained entirely within the lubricant cavity, extend from wall 37 axially away from the stator to a point just short of the under surface of cover plate 68. Encircled by the barriers are arcuate shaped openings 78 which extend entirely through bottom wall 37 in direct aligned communication with a preselected arcuate length of the air gap 16. The openings, although encompassed by the axial flanges in an axial direction, are entirely unobstructed, that is, are free of lubricant reservoir material 66 or other material. As illustrated, the barriers are in diametrically opposed relation, each having an angular length in the neighborhood of 70° to 80°. This construction performs several functions.

In the first place, in spite of the large reservoir furnished at each end of the motor which covers substantially the entire side face of the stator, proper alignment of the rotor shaft 23 and bearings 56 is still permitted. For example, in the assembly of motor 10, the stator 11 and rotor 15 may be intially assembled together with conventional shims (not illustrated) inserted in air gap 16 and may extend beyond each side face of the stator.

These shims maintain the rotor and stator in a temporarily fixed, concentric relation with an established annular air gap between the parts. At this time, passageways 51 and 52 may be substantially filled with bonding material 50 in an unhardened state. Casing 31 having the bearings mounted in place but preferably without either absorbent material 66 or plate 68 being yet installed (see FIG. 4), may then be arranged at either end of the stator 11. In the assembled position protuberances 47 and 48 will extend into passageways 51 and 52 and bosses 42 will be in abutting relation to side faces 45 of the stator. Further, the shims will extend into and preferably through opening 78 of at least one casing. Shaft 23, which is accommodated by bearings 56, will serve to support casing 31 and concurrently properly align bearings 56 relative to one another and to the shaft if the component parts are assembled with the axis of the shaft disposed horizontally. With the motor components thus assembled, material 50 in the passageways is hardened or, in the case of thermo-setting epoxy resin, may be cured by the application of heat while the axis of the shaft is held horizontally. Thereafter, the shims can be removed from air gap 16 through openings 78 to release the rotor and stator for relative rotation. Finally, lubricant material 66 in the form of a pad, substantially conforming in outer configuration to walls 33–36 and having suitable arcuate apertures for receiving flanges 79, is positioned within the cavity, lubricant is supplied to the pad from the outboard side of the casing, and cover plate 68 is then secured in place.

The second function of opening 78 is that it permits the ingress and egress of air into and from the casing so that the same air pressure is maintained inside as well as outside the case. If no openings were provided in the casing, either pressure build-up or pressure reduction could occur within assembly 30, depending upon the ambient temperature and the temperature of operation, which might in turn cause the lubricant, such as oil, to seep through the bearing either faster or slower than is desired. In other words, effective oiling of the bearing might be interferred with over a period of time. Therefore, openings 78 are in effect breather vents for each assembly 30 which allow air to enter and leave the cavity of casing 31, thereby insuring that the air pressure within the casing is the same as that of the surrounding environment.

Another feature of the hollow flanges 79 is their prevention of capillary flow of lubricant from lubricant absorbent material 66 outwardly of the reservoir through unobstructed openings 78 which are in communication with the ambient. In particular, the axial length of flange 79 and the radial width of openings 78 (substantially greater than the rather small dimension required to establish a capillary path, e.g., below 0.06 inch, generally speaking) both contribute toward retaining the lubricant within the cavity without loss by way of the openings.

Consequently, it will be recognized from the foregoing that the present invention an improved and unusually large lubricant reservoir is provided which is capable of storing a large quantity of lubricant which, in turn, permits the motor incorporating the invention to be mounted in relatively inaccessible locations without the need for resupplying lubricant to the reservoir from time to time. In addition, in spite of the large reservoir provided, the motor is compact, rugged in design, and is inexpensive to manufacture. Moreover, proper alignment of the bearings and shaft is achieved even though the air gap at each end of the motor may be entirely covered by the bearing supporting and lubricating structure.

Of course, it will be realized by those skilled in the art that the benefits derived from the present invention are applicable to other motors than the type illustrated and various changes may be made without departing from the scope and the spirit of the invention. For example, for single output extension motor applications in which the shaft need not extend entirely through both end frame assemblies, plate 68 of the assembly opposite the shaft extension side of the motor may be made entirely imperforate, that is, without flanged opening 72. While in accordance with the patent statutes, I have described what at present is considered to be the preferred embodiment of my invention, it will be obvious to those skilled in the art that numerous other changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A dynamoelectric machine comprising a stator; a shaft; a rotor carried by said shaft for relative rotation with said stator and defining an air gap with said stator; at least one bearing journaling said shaft having axial grooves extending along the outer periphery thereof; and frame means supporting each bearing and a lubrication reservoir for supplying lubricant to the journal surface of each bearing; said means including a casing mounted adjacent the side face of said stator forming a cavity with one wall extending generally radially to said side face; means attached to said casing generally enclosing the cavity at the outboard end of the bearing; said one wall having a central flanged section through which the shaft extends and a number of angularly spaced posts projecting axially away from said stator; said posts being accommodated in the axial grooves of said bearing and mounting said bearing within said cavity; lubricant retaining means arranged within said cavity encircling the longitudinal periphery of said bearing for feeding lubricant to the journal thereof; said flanged section having a number of capillary grooves formed in the surface thereof disposed toward the inboard end of the bearing and surrounding said shaft; said capillary grooves extending from locations adjacent said shaft to said lubricant retaining means for recapturing excess lubricant from the inboard end of the bearing and returning the lubricant by capillary attraction to said retaining means.

2. The dynamoelectric machine of claim 1, in which said casing includes integral protuberances extending into passageways formed in the stator outwardly of said air gap, and adhesive material disposed in said passageways for securing said protuberances to said stator.

3. A dynamoelectric machine comprising a stator; a shaft; a rotor carried by said shaft for relative rotation with said stator and defining an air gap with said stator; at least one bearing journaling said shaft; a casing mounted adjacent the side face of said stator forming a cavity with one wall extending outwardly beyond said air gap; means mounting said bearing within said cavity; lubricant retaining means disposed within said cavity substantially surrounding the longitudinal periphery of said bearing for feeding lubricant to the journal of said bearing; said wall including at least two arcuate shape hollow flanges each encompassing an unobstructed opening extending entirely through said wall in alignment with a part of the circumferential length of said air gap, said openings and hollow flanges being free of lubricant retaining means and sufficiently large to permit access to said air gap for removal of shims therefrom during the assembly of the machine and to prevent the escape of lubricant therethrough from said lubricant retaining means.

4. The dynamoelectric machine of claim 3 in which the means mounting the bearing comprises a plurality of axial grooves formed at angularly spaced apart locations on the longitudinal periphery of said bearing and said casing wall includes integral posts accommodated in said grooves, with the free ends of said posts being turned over into engagement with the outboard side of said bearing.

5. The dynamoelectric machine of claim 3 in which said casing includes integral protuberances extending into passageways formed in the stator outwardly of said air gap, and adhesive material disposed in said passageways for securing said protuberances to said stator.

6. The dynamoelectric machine of claim 5 in which integral embossments are formed in said casing radially outward of said cavity and have said protuberances formed on the side facing said stator, said embossments having means for mounting the machine to a support on the side thereof romote from said stator.

7. The dynamoelectric machine of claim 3 in which said casing wall includes a flanged section through which the shaft extends adjacent but in spaced relation to the inboard end of the bearing, said section having a plurality of angularly spaced capillary grooves formed in the surfaces thereof surrounding the shaft at said inboard end of the bearing and extending to said lubricant retaining means for recapturing excess lubricant from that end and returning it by capillary attraction to said lubricant retaining means.

No references cited.

MILTON O. HIRSHFIELD, *Primary Examiner.*

J. W. GIBBS, *Assistant Examiner.*